J. A. SMITH.
CUTTING TOOL.
APPLICATION FILED APR. 21, 1909.
967,683.
Patented Aug. 16, 1910.
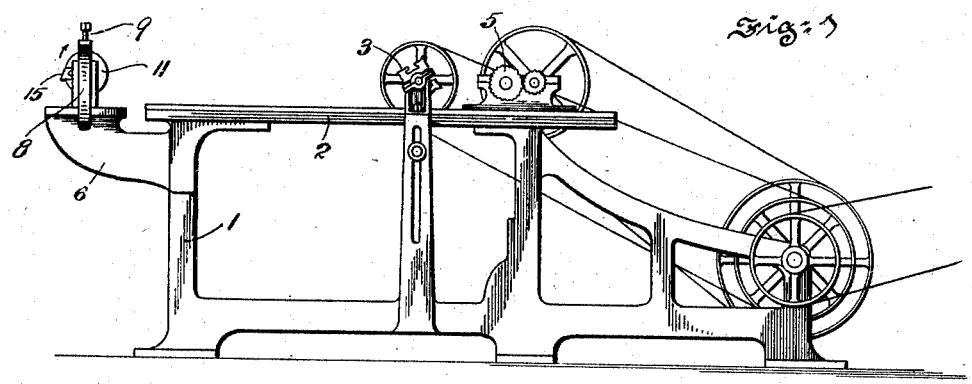
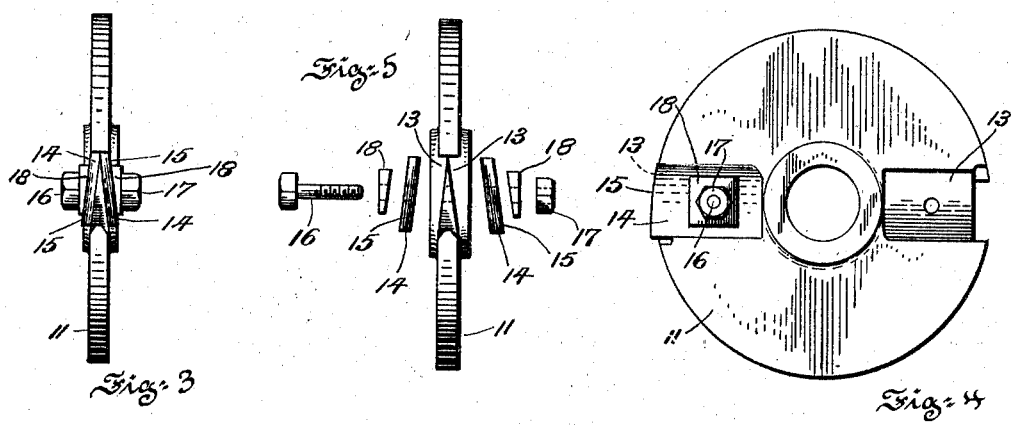
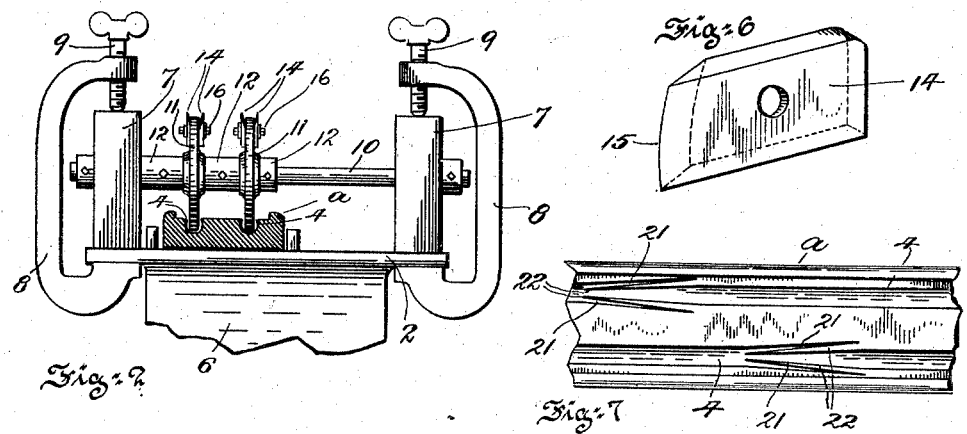
WITNESSES:
Mabel Kimmig
Grant C. Osborne
INVENTOR.
Joseph A. Smith.
BY
William J. Jackson.
ATTORNEY.

UNITED STATES PATENT OFFICE.

JOSEPH A. SMITH, OF PHILADELPHIA, PENNSYLVANIA, ASSIGNOR TO WILLIAM H. G. KIRKPATRICK, OF PHILADELPHIA, PENNSYLVANIA.

CUTTING-TOOL.

967,683.   Specification of Letters Patent.   Patented Aug. 16, 1910.

Application filed April 21, 1909.   Serial No. 491,358.

*To all whom it may concern:*

Be it known that I, JOSEPH A. SMITH, a citizen of the United States, residing at Philadelphia, in the county of Philadelphia and State of Pennsylvania, have invented a certain new and useful Cutting-Tool, of which the following is a specification.

The principal object of the present invention is to provide a cutting tool for incising at intervals the wall of a longitudinal wire receiving groove in an electric wire conductor molding to provide retaining portions projected within the groove, whereby a wire may be retained within the groove of said molding when in use.

Other objects of the invention relate to general details of construction and arrangement of parts.

The invention consists of the improvements hereinafter described and finally claimed.

The nature, characteristic features and scope of the invention will be more fully understood from the following description taken in connection with the accompanying drawing forming part hereof and in which:

Figure 1, is a view in side elevation of a molding machine provided with a cutting tool of the invention, Fig. 2, is a view in front elevation drawn to an enlarged scale of the cutting tool of the invention, Fig. 3, is a view in front elevation of one of the rotatable disks and its complemental knife blades, Fig. 4, is a view in side elevation of the same, Fig. 5, is a view in front elevation illustrating the various parts of a disk and its blades about to be assembled, Fig. 6, is a perspective view of one of the knife blades, and Fig. 7, is a face view of the under side of a molding as incised by the cutting tool of the invention.

Referring to the drawings, a brief description will first be given of the molding machine illustrated in Fig. 1, wherein so much of the machine is shown as is necessary to the understanding of the invention. In the manufacture of electric wire conductor molding a piece of molding is passed through a machine of this character in order to gouge out or form one or more longitudinal wire receiving grooves.

As shown the molding machine consists of a frame 1, supporting a work table 2. Above the work table 2, is mounted a rotatable cutter 3, for gouging out one or more longitudinal grooves 4, (see Figs. 2, and 7) of a piece of molding as it is fed through the machine by means of a toothed wheel 5.

Arranged at the front of the machine there is usually a supporting element 6, use of which is made in the present instance for supporting the cutting tool of the invention. Clamped to this support 6, as by brackets 8, and set screws 9, are bearing blocks 7. This is an inexpensive construction and may be readily detached from the machine if desired.

Fixed with relation to the bearing blocks 7, is a shaft 10, loosely mounted upon which are one or more rotatable disks 11, suitably spaced upon the shaft 10, by means of collars 12. As illustrated, the opposite faces of these disks 11, are counter-sunk as at 13, the said counter-sunk portions being beveled as clearly illustrated in Fig. 5. Fitted within these counter-sunk portions of the disks 11, are blade sections 14, provided with knife-like beveled cutting edges 15, which are formed upon an arc of a circle as clearly shown in Fig. 4. When these blade sections are fitted within the counter-sunk beveled portions of the disks 11, the cutting edges 15, of the blades 14, are arranged at an inclination to the faces of the disks 11. In other words the cutting edges of these blades are flush with the disk faces at one point and at the other extreme point extend beyond the said faces and serve to form a generally V-shaped cutting tool. Use is made in the present instance of bolts 16, and nuts 17, for securing the blade sections with respect to the disks 11. In this connection it may be remarked that beveled or wedge-shaped washers 18, (see Fig. 5) are used in order that the bolt 16, and nuts 17, may secure the parts of the cutting tool firmly together. In other words the beveled portions of the washers 18, abut against the blade sections 14, in their inclined position thereby providing a perpendicular surface against which the bolt head and nuts abut. In practice use is made of two blade sections 14, upon each disk so that when the disks 11, revolve they will make incisions 21, (see Fig. 7) in the walls of the longitudinal grooves 4, of the molding $a$, at suitable intervals. In Fig. 4, the disk is shown as being provided with an extra counter-sunk portion for the reception of an additional blade section if desired.

The operation of incising a molding in accordance with the invention will now be given.

Work to be done is fed along the table 2, by means of the wheel 5, reaches the cutter head 3, and is gouged out to form the longitudinal grooves 4, and is otherwise shaped and finished to form molding in the well understood manner. As the molding is continued to be fed along over the table 2, the disks 11, which are free to rotate on the shaft 10, travel within these longitudinal grooves 4, and are caused to rotate in the direction of the arrow in Fig. 1. As the disks 11, revolve the blade sections 14, once in every revolution of the disks 11, incise the side walls of the grooves 4, of the molding a, and form at intervals resilient retaining portions 22, that project within the grooves 4. As clearly illustrated in Fig. 7, these retaining pieces are generally wedge shaped.

By the above described operation wood may be run through a molding machine to shape and cut its grooves and other parts and the cutting tool of the invention operate upon the molding as it is about to leave the machine and form the above described incisions and retaining portions thereby in one operation and without rehandling of the wood or stopping of the machine produce a commercially valuable molding at a cost not in excess of the cost of manufacture of ordinary molding.

What I claim is:

1. The combination with a table and means adapted to feed a molding thereover and a moving tool shaped and proportioned to travel in a groove in the molding and having spaced laterally projecting inclined knives adapted to incise the walls of the groove in the molding.

2. The combination with a table and means adapted to feed a molding thereover of a moving tool shaped and proportioned to travel in a groove in the molding and having a peripherally and laterally projecting inclined knife adapted to incise one of the walls of the groove in the molding.

3. A cutting tool of the class described comprising a rotatable disk having upon its opposite faces beveled counter-sunk portions, blade sections fitted within said counter-sunk portions so that the cutting edges of said blades are arranged at an inclination to the faces of said disk, and means for securing said blades to the disk.

4. In combination a work receiving table, a cutting device embodying a disk and a movable blade mounted above said table, means for feeding work toward said disk and tool said disk proportioned and adapted to engage in a groove in the work and in the forward movement of said work tracking in the groove of the work thereby imparting a rotary motion to the disk and tool whereby the walls of the groove are incised at intervals to provide retaining portions that project within the groove.

5. A cutting tool comprising a rotatable disk shaped and proportioned to travel in a molding groove said disk having upon its face a laterally disposed inclined counter-sunk portion, a peripherally and laterally projecting inclined knife fitted within the counter-sunk portion and means for securing the knife to said disk.

6. A cutting tool comprising a rotatable disk shaped and proportioned to travel in a molding groove said disk being provided with spaced peripherally and laterally projecting inclined knives and means for securing said knives to the disk.

7. A cutting tool comprising a rotatable disk shaped and proportioned to travel in a molding groove said disk being provided with spaced peripherally and laterally projecting inclined knives, washers having inclined and flat faces the inclined faces thereof abutting against said knives and bolt and nut connections for securing the knives to the disk, the flat faces of the washers affording perpendicular surfaces against which the bolt head and nut abut.

In testimony whereof I have hereunto signed my name.

JOSEPH A. SMITH.

Witnesses:
GUSTAV BAUER,
J. EDW. BURT.